United States Patent
Lee et al.

(10) Patent No.: US 11,002,483 B2
(45) Date of Patent: May 11, 2021

(54) BATTERY THERMAL TREATMENT APPARATUS AND METHOD FOR BATTERY THERMAL TREATMENT

(71) Applicant: SUNGEEL HITECH CO., LTD, Gunsan-si (KR)

(72) Inventors: Kwang-Bum Lee, Gunsan-si (KR); Suk-Hyun Byun, Gunsan-si (KR); Kang-Myung Yi, Seoul (KR); Cheol-Weon Jeong, Gunsan-si (KR); Sun-Woo Jang, Gunsan-si (KR)

(73) Assignee: SUNGEEL HITECH CO., LTD, Gunsan-Si (KR)

( * ) Notice: Subject to any disclaimer, the term of this patent is extended or adjusted under 35 U.S.C. 154(b) by 360 days.

(21) Appl. No.: 16/134,646

(22) Filed: Sep. 18, 2018

(65) Prior Publication Data

US 2019/0086149 A1    Mar. 21, 2019

(30) Foreign Application Priority Data

Sep. 21, 2017  (KR) .......................... 10-2017-0121702
Sep. 21, 2017  (KR) .......................... 10-2017-0121703

(51) Int. Cl.
*F27B 7/38* (2006.01)
*H01M 10/54* (2006.01)
*F23G 5/00* (2006.01)

(52) U.S. Cl.
CPC ............... *F27B 7/38* (2013.01); *F23G 5/006* (2013.01); *H01M 10/54* (2013.01); *F23G 2900/7007* (2013.01)

(58) Field of Classification Search
CPC ........................................................ F27B 7/38
See application file for complete search history.

(56) References Cited

U.S. PATENT DOCUMENTS 4,179,265 A * 12/1979 Gildersleeve ......... F26B 11/028
                                                    34/571
4,874,486 A * 10/1989 Hanulik ................. C22B 13/045
                                                    205/704
(Continued)

FOREIGN PATENT DOCUMENTS

JP        61-61687 A     3/1986
JP       10-501650 A     2/1998
(Continued)

OTHER PUBLICATIONS

JPS61-61687—machine translation (Year: 1986).*
Extended European Search Report for Application No. EP 18 19 5855, dated Jan. 22, 2019, 8 pages.

*Primary Examiner* — Nathaniel Herzfeld
(74) *Attorney, Agent, or Firm* — Lewis Roca Rothgerber Christie LLP

(57) ABSTRACT

A battery thermal treatment apparatus including, a thermal treatment part, in which a battery is transferred and thermally treated through a closed tube; and a gas handling part, which cools and performs dust collection of gas generated in the thermal treatment part, and, a method for battery thermal treatment and performing dust collection of thermal treatment gas, including, cooling and performing dust collection of gas generated during thermal treatment of a battery, which is transferred and in one direction through a closed tube, thermally treated at a temperature ranging from 400° C. to 1000° C., and discharged.

14 Claims, 7 Drawing Sheets

(56) References Cited

U.S. PATENT DOCUMENTS

| | | | | |
|---|---|---|---|---|
| 5,199,975 A | * | 4/1993 | Gunjishima | B09B 3/0083 |
| | | | | 75/669 |
| 6,009,817 A | * | 1/2000 | Hanulik | H01M 6/52 |
| | | | | 110/219 |
| 2016/0315330 A1 | * | 10/2016 | Picard | C21C 1/08 |

FOREIGN PATENT DOCUMENTS

| JP | 2001-250594 A | | 9/2001 |
|---|---|---|---|
| JP | 2016117009 A | * | 6/2016 |

* cited by examiner

BATTERY THERMAL TREATMENT APPARATUS AND METHOD FOR BATTERY THERMAL TREATMENT

CROSS-REFERENCE TO RELATED APPLICATION

This application claims priority to Korean Patent Application No. 10-2017-0121702 filed on Sep. 21, 2017 and Korean Patent Application No. 10-2017-0121703 filed on Sep. 21, 2017, and all the benefits accruing therefrom under 35 U.S.C. § 119, the contents of which is incorporated by reference in its entirety.

BACKGROUND OF THE INVENTION

(a) Field of the Invention

The present disclosure relates to an apparatus for thermally treating a battery and handling harmful gases generated in the process and a method for thermally treating the battery and cooling and performing dust collection of the generated gas.

(b) Description of the Related Art

Recently, the use of a battery pack including a plurality of unit battery cells has been increasing. A battery pack includes a plurality of electrically connected battery modules. The battery modules include battery cells that are electrically connected to each other. These battery packs are widely used in electric vehicles (EV) and hybrid electric vehicles (HEV) that require a large electric capacity.

Electric vehicles and hybrid electric vehicles are attracting attention as next-generation vehicles, and production volume thereof is expected to increase sharply. As a result, waste battery packs and lithium secondary batteries that were used in the electric vehicles are also expected to increase sharply in the future. However, current methods for treating waste battery packs include battery discharging-crushing-particle separating-magnetic separating, and so on which consumes much time and money.

Meanwhile, a battery is made to have a predetermined life span depending on the environment it is used in. This is due to performance deterioration of chemical reactions caused by contamination of an electrolytic solution and damage of an electrode surface during a repetitive chemical reaction of charging and discharging. As a result, there is a need to replace the batteries at some point, and these batteries are classified as waste batteries. Therefore, a technology for safely disposing waste batteries and for recovering expensive substances contained therein must be accompanied. As an example of the related art, a method comprising, discharging waste batteries in sulfuric acid for about 14 to 20 days, drying and then crushing the waste batteries. Such a method requires using sulfuric acid which is harmful to workers and working environment. Thus, it is highly possible for the workers to be diagnosed with occupational diseases, and there is a risk of fire and gas poisoning during the drying of the batteries. In addition, it takes a long time to treat the batteries, so not only is the efficiency of the process lowered, but there is also risk of serious environmental problems if the solution used in the process leaks out.

Therefore, studies are needed for devices and methods that can efficiently discharge and crush batteries without the danger of explosions as well as for recovering valuable metals from the batteries.

As a related prior art, "a method for recovering valuable metals from a waste battery pack" is disclosed in Korean Granted Patent Publication No. 10-1149762. As a related prior art, there is also Korean Granted Patent Publication No. 10-1266859.

SUMMARY OF THE INVENTION

The present disclosure is directed to providing an apparatus and method that can reduce processing time and labor costs for disassembling a waste battery, and with a simplified process, can easily remove components other than valuable metals of the battery, as well as easily treating harmful gases that are generated.

According to an aspect of the present disclosure, a battery thermal treatment apparatus is provided, the battery thermal treatment apparatus including, a thermal treatment part, in which a battery is transferred and thermally treated through a closed tube; and a gas handling part, which cools and performs dust collection of gas generated in the thermal treatment part.

Further, according to another aspect of the present disclosure, a method for battery thermal treatment and performing dust collection of thermal treatment gas is provided, the method including, thermally treating a battery, which is transferred in one direction through a closed tube, at a temperature of 400° to 1000° and discharging the same, and cooling and performing dust collection of gas that is generated during the thermal treatment.

According to an aspect of the present disclosure, it is possible to thermally treat a battery while harmful gas generated therefrom can be minimized.

Further, it is possible to noticeably reduce time and labor costs for disassembling a waste battery.

It should be understood that the effects of the present disclosure are not limited to the effects described above, but include all effects that can be deduced from the detailed description of the present disclosure or the constitution of the disclosure described in the claims.

DETAILED DESCRIPTION OF THE EMBODIMENTS

Hereinafter, preferred embodiments of the present disclosure will be described in detail with reference to the accompanying drawings.

The advantages and features of the present invention and the manner of accomplishing it will become apparent with reference to the embodiments described in detail below with reference to the accompanying drawings.

However, it is to be understood that the present invention is not limited to the disclosed embodiments, but may be embodied in many different forms and should not be construed as limited to the embodiments set forth herein. Rather, these embodiments are provided so that this disclosure will fully convey the scope of the invention to those skilled in the art, and the invention is only defined by the scope of the claims.

Further, when it is determined that related art or the like may obscure the gist of the present invention in describing the present invention, detailed description thereof will be omitted.

An aspect of the present disclosure provides a battery thermal treatment apparatus 1000 which includes, a thermal treatment part 100, in which a battery is transferred through a closed tube 110 and is thermally treated;

and a gas handling part 200, in which gas generated in the thermal treatment part is cooled and dust collection is performed.

Hereinafter, each component of a battery thermal treatment apparatus 1000 according to an aspect of the present disclosure will be described referring to FIGS. 1 to 8.

Figure 7:
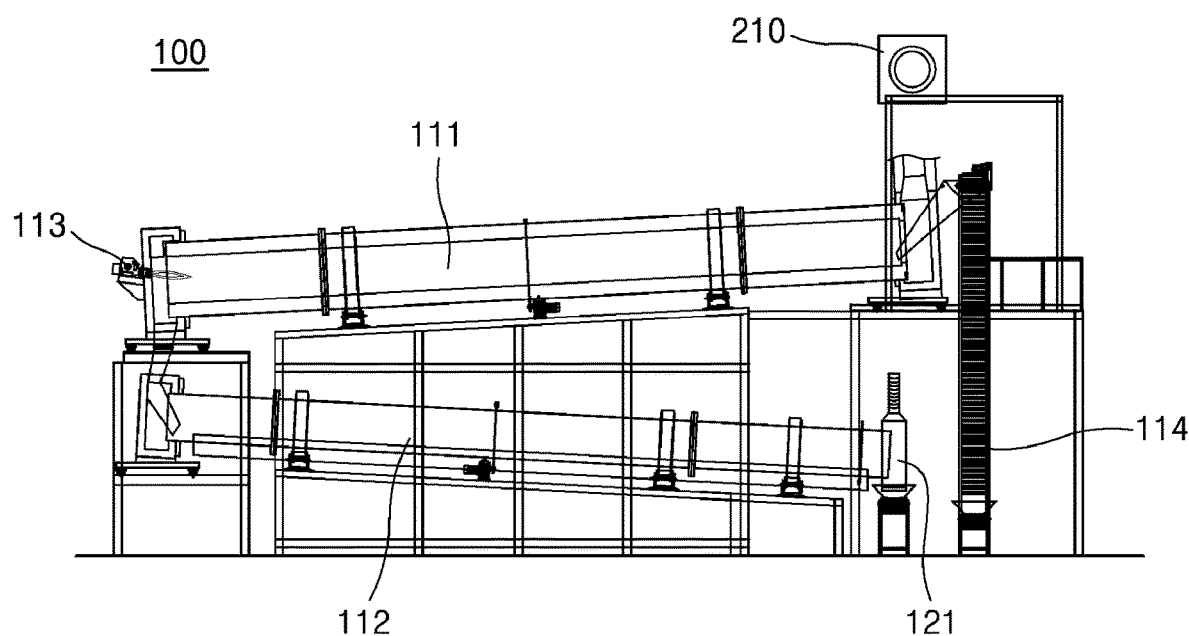
FIG. 7 is a front view showing an example of a thermal treatment part according to an embodiment of the present disclosure.
Figure 8:
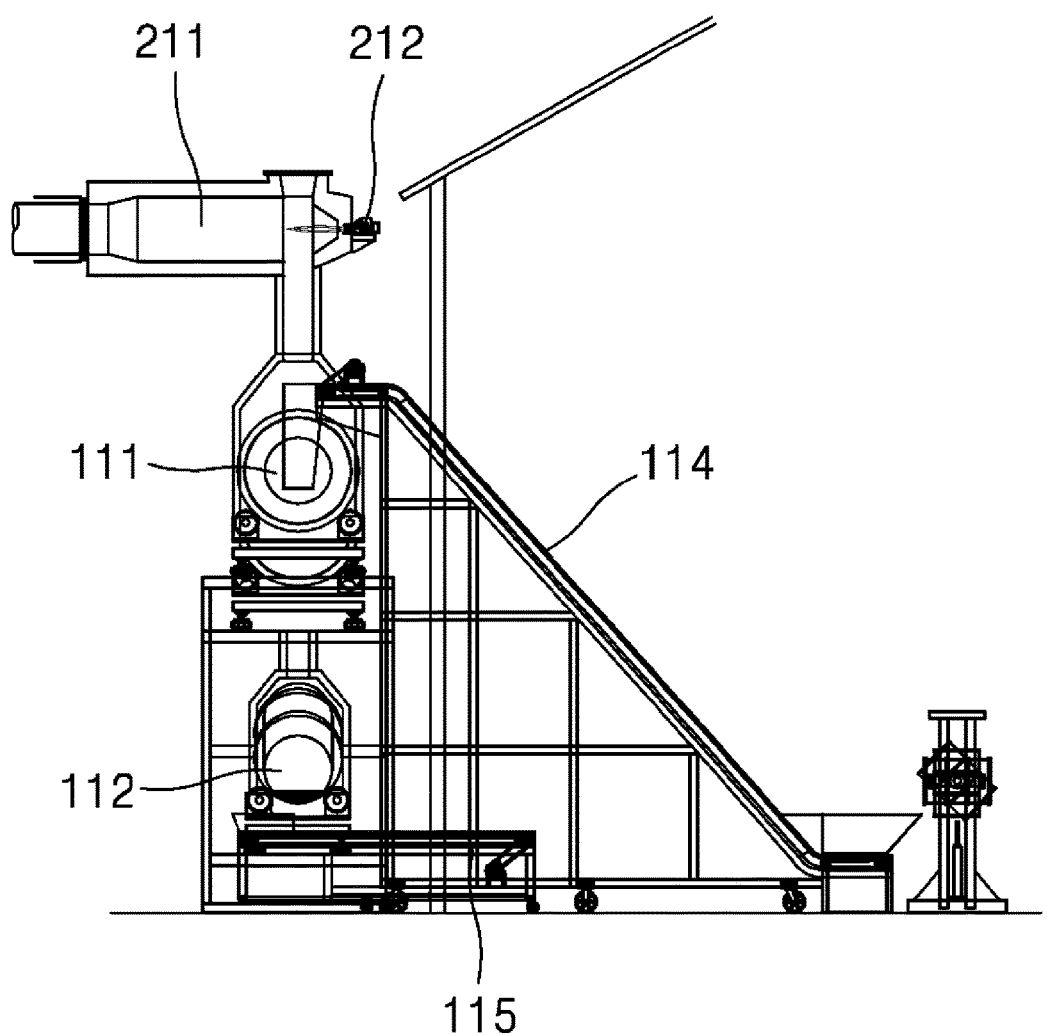
FIG. 8 is a side view showing an example of a thermal treatment part according to an embodiment of the present disclosure.
Figure 9:
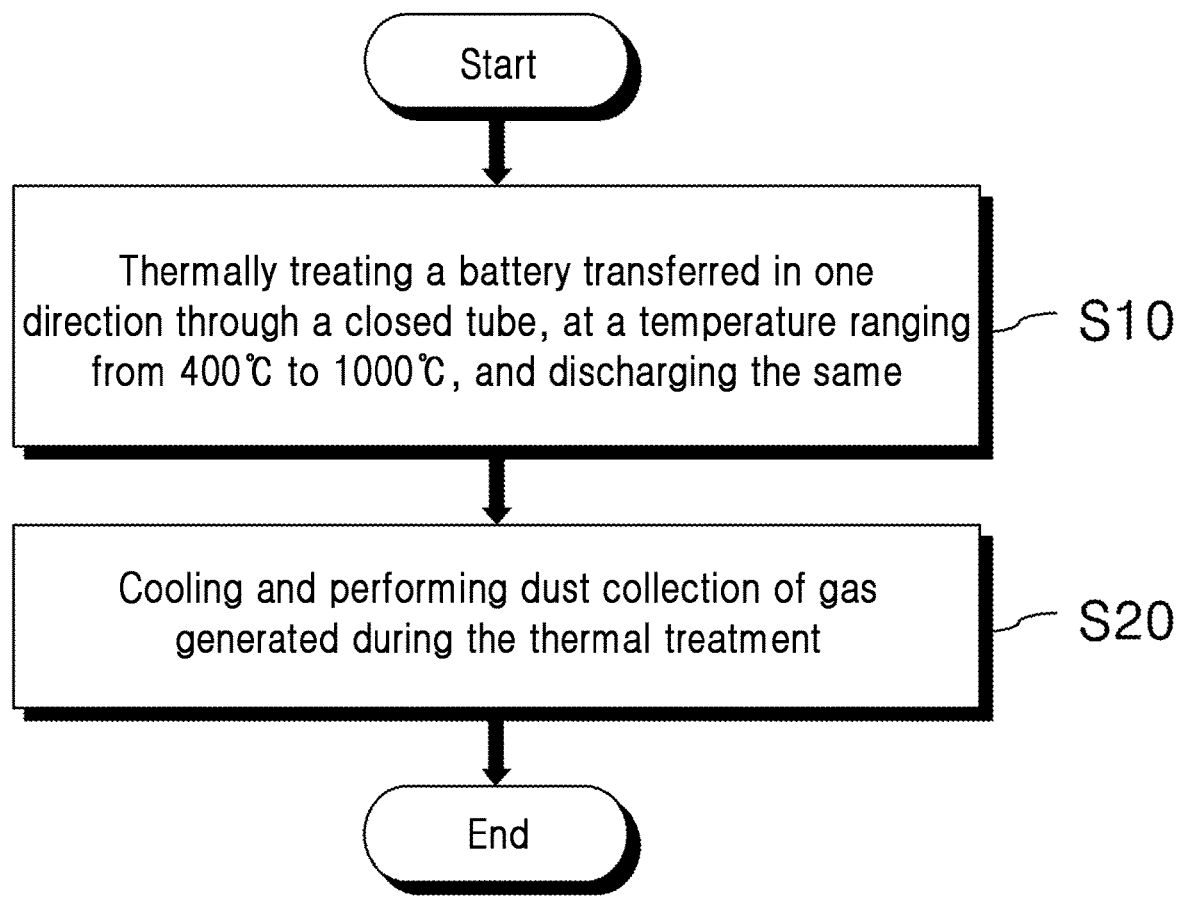
FIG. 9 is a schematic view showing an example of a method for thermally treating a battery and performing dust collection of thermally treated gas according to an embodiment of the present disclosure.

A battery thermal treatment apparatus 1000 according to an aspect of the present disclosure may have a thermal treatment part 100 which may include, a first tube 111, wherein a battery is transferred in a downwardly inclined manner as shown in FIG. 7, provided with a first heating means 113 at one end; and a second tube 112, communicating with the first tube 111 and provided so as to be inclined downwards. The first tube and the second tube may be in a form of a rotary kiln which rotates while being thermally treated.

The inclination angle of the first tube and the second tube may range from 10° to 35° in respect to the ground surface. A battery can be easily transferred and heat-treated in the range of the inclination angle.

As shown in FIG. 7, the first heating means 113 may be provided at one end of the first tube 111 and can shoot flames in a downwards direction in which a battery is being transferred or in an opposite direction of the transferring direction, or the first heating means 113 may be provided outside the closed tube and can apply heat through thermal radiation, conduction or the like. At this time, the heat treatment temperature may be 400° C. to 1000° C. If the heat treatment temperature using the first heating means is less than 400° C., a polymer component in the battery may not be easily decomposed. If the heat treatment temperature through the first heating means exceeds 1000° C., excessive energy may be wasted in removing the polymer and electrolyte of the battery. There is also a risk of the recovery rate of valuable metal being lowered.

The first heating means 113 may use one or more selected from a group consisting of light oil, refined oil, LNG, LPG, regeneration oil, and so on as fuel and may inject it and ignite.

The first heating means 113 may also be provided on an outer circumferential surface of the first tube 111 to heat the first tube by thermal radiation, conduction, or the like.

The first tube 111 and the second tube 112 may be closed tubes and gas generated by a heat treatment of a battery of the first heating means 113 may be transferred to a gas handling unit 200, to block exposure of harmful substances in the air.

The heat treatment part 100 may include a battery hopper; and a conveyor 114 for receiving a battery from the battery hopper and putting the battery into the heat treatment part. As shown in FIG. 7, a sliding means that enables a battery to be directed to the first tube from an end of the conveyor may be provided so as to enable a battery to be put in at an end of the first tube 111.

The second tube 112 may be provided with a means for spraying a coolant (not shown) on an outer circumferential surface of the second pipe to cool the pipe.

The thermal treatment part 100 may include a collecting part 121 at an end of the second tube 112, for receiving a substance that is heat-treated by the first heating unit 113 and descends through the second tube 112; and a transferring means 115 for transferring the collected substance.

The thermal treatment part 100 may include a first dust collecting part 122 that communicates with an end of the second tube 112 and performs dust collection of gas other than the substance that descends the second tube.

The first dust collecting part 122 may include a bag filter for the dust collection of the gas.

According to an aspect of a battery thermal treatment apparatus 1000 of the present disclosure, the gas handling part 200 may cool the gas that is generated in the thermal treatment part 100 and perform dust collection of the same.

Figure 1:
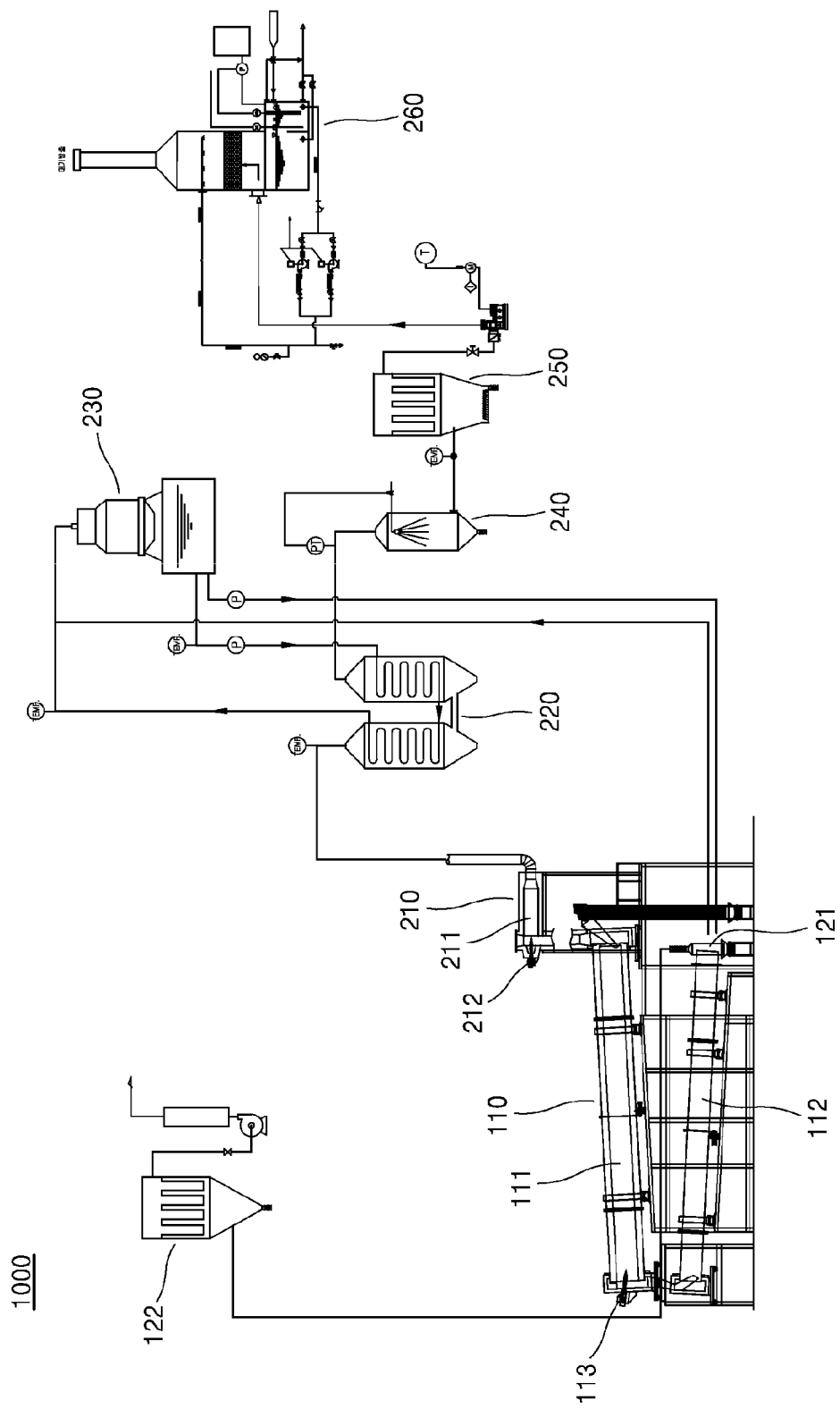
FIG. 1 is a schematic view showing an example of a battery thermal treatment apparatus according to an embodiment of the present disclosure.
Figure 2:
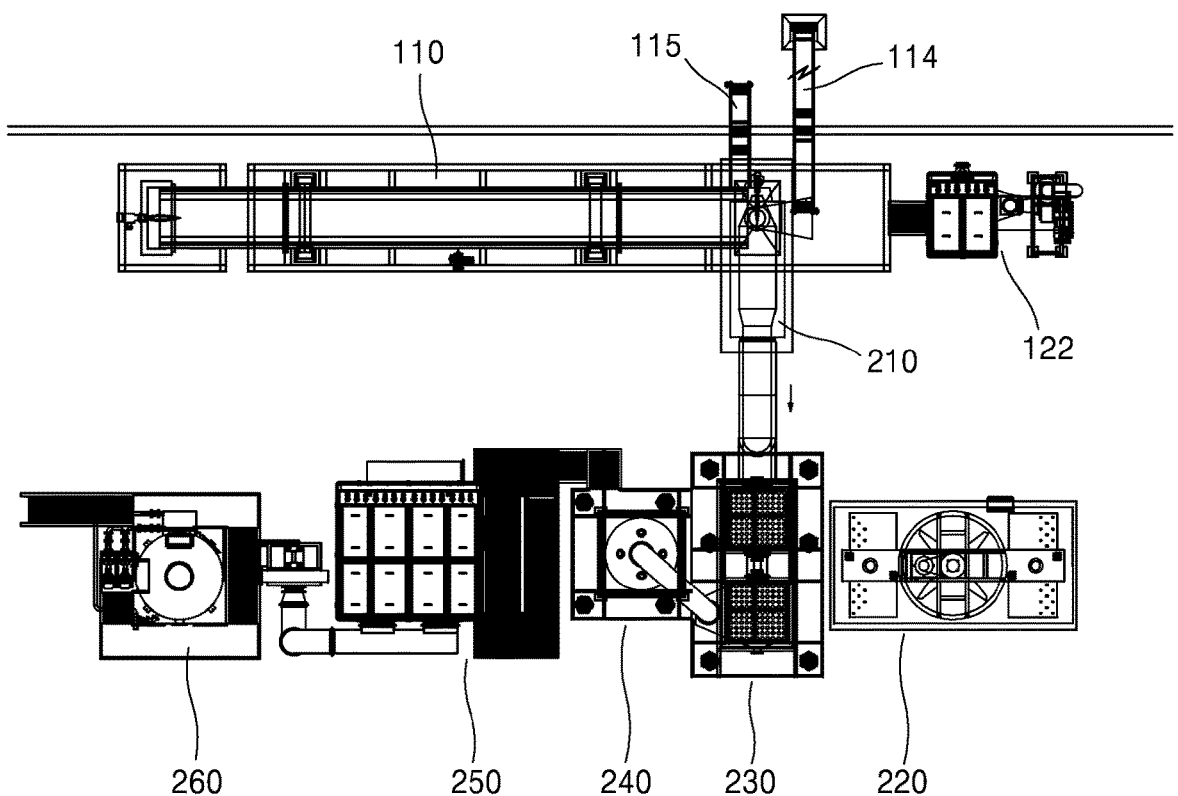
FIG. 2 is a plan view showing an example of a battery thermal treatment apparatus according to an embodiment of the present disclosure.
Figure 3:
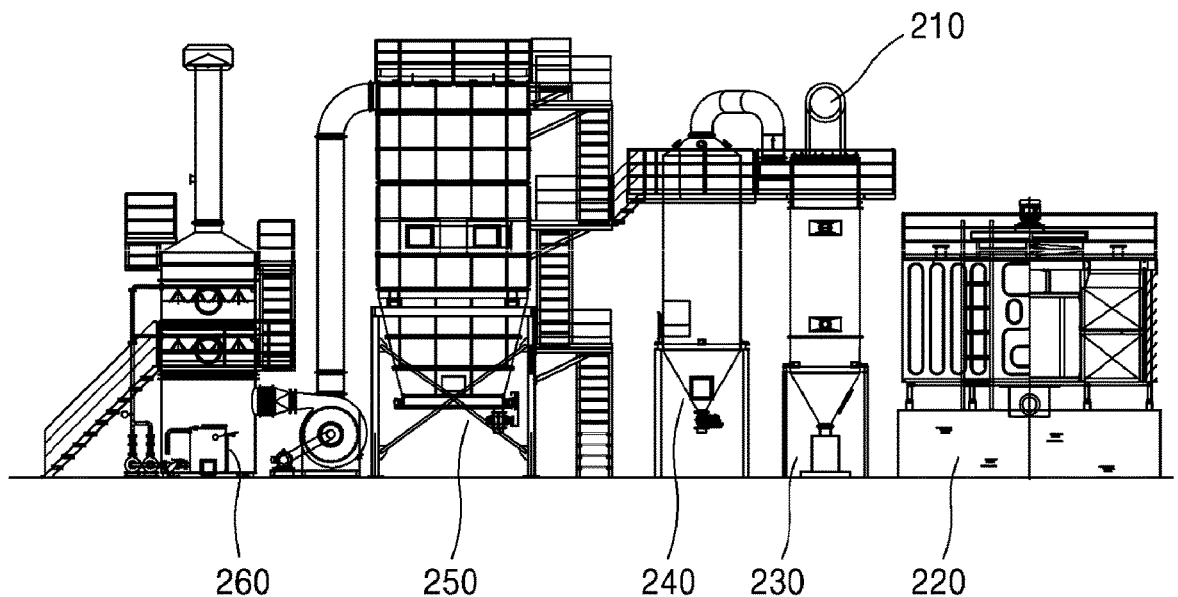
FIG. 3 is a front view showing an example of a gas handling part according to an embodiment of the present disclosure.
Figure 4:
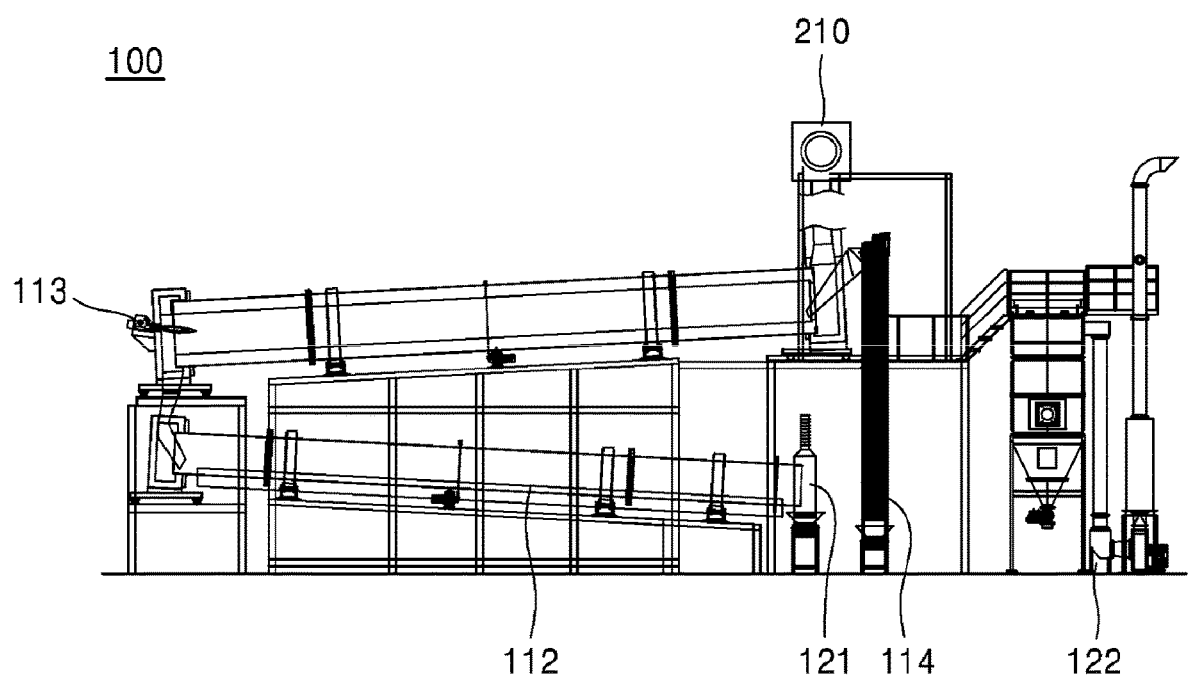
FIG. 4 is a front view showing an example of a thermal treatment part according to an embodiment of the present disclosure.
Figure 5:
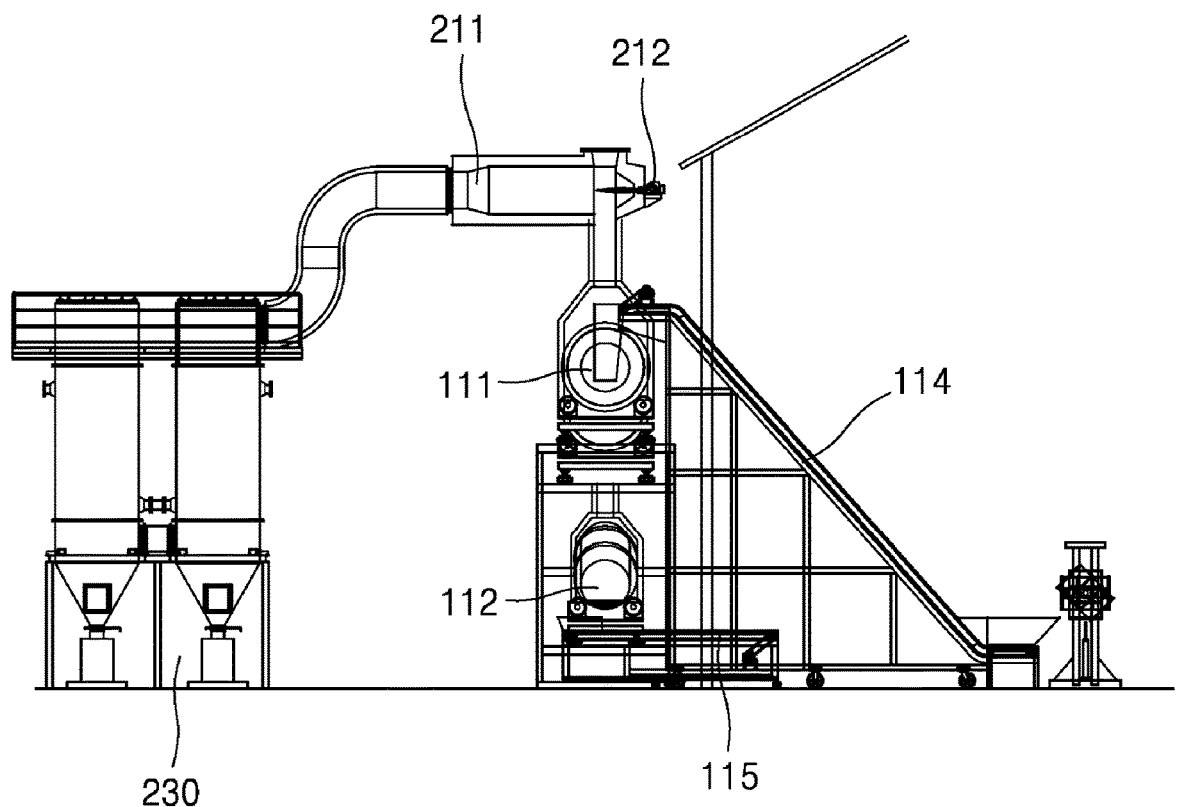
FIG. 5 is a side view showing an example of a thermal treatment part and a gas handling part according to an embodiment of the present disclosure.
Figure 6:
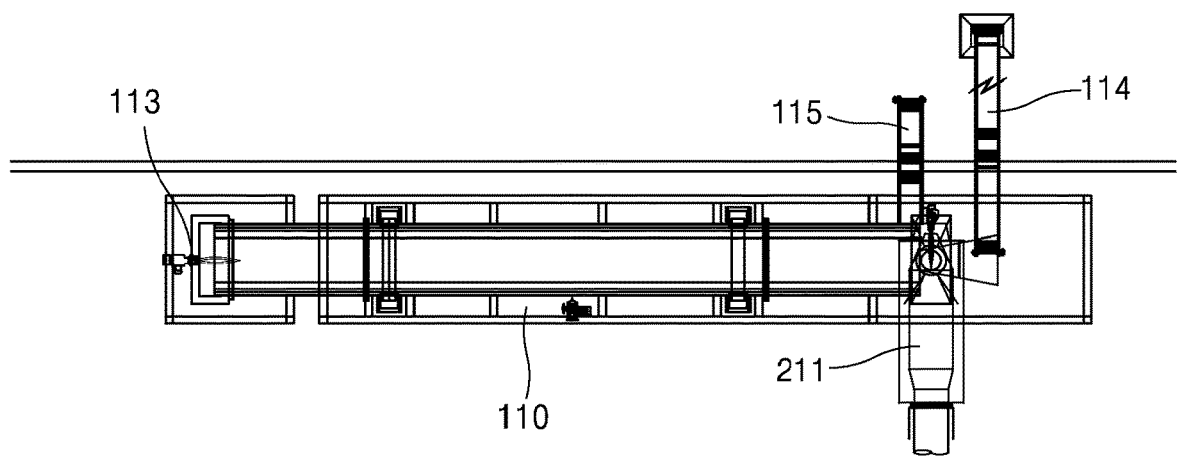
FIG. 6 is a plan view showing an example of a thermal treatment part according to an embodiment of the present disclosure.

As shown in FIG. 1, the gas handling part 200 may include, a gas heat-treatment part 210 which communicates with an upper part of the thermal treatment part 100, more particularly, an upper part of the first tube 111, to heat-treat gas from the thermal treatment part; a heat-exchange part 220 communicating with the gas heat-treatment part for cooling transferred gas; a cooling tower 230 which circulates a coolant to the heat-exchange part; and a second dust collecting part 250 which collects dust from gas that is passed through the heat-exchange part and emitted.

In more detail, the gas heat-treatment part 210 may include a third tube 211 that communicates with an upper part of the thermal treatment part, which may be the upper part of the first tube 111; and a second heating means 212 provided at one end of the third tube and can shoot flames in a direction in which the gas is being transferred. Through the second heating means, the transferred gas may be heat-treated at a temperature ranging from 700° C. to 900° C. By being heat-treated at such a temperature range, the polymer components in the gas can be completely decomposed.

The second heating means 212 may use one or more selected from a group consisting of light oil, refined oil, LNG, LPG, regeneration oil, and so on as fuel and may inject it and ignite, thereby increasing the thermal decomposition efficiency of the polymer.

The heat-exchange part 220 exchanges heat between gas emitted from the gas heat-treatment part 210 and the coolant circulating in the heat-exchange part. Due to the heat exchange, the gas temperature can be cooled to 150° C. to 250° C.

The gas handling part 200 may include a spray tower 240 which communicates with the heat-exchange part 220 and the second dust collecting part 250, and is configured to spray gas emitted from the heat-exchange part through a spraying means and then emit the gas to the second dust collecting part. The spray tower may satisfy a temperature range of 100° C. to 150° C. so that moisture does not condense.

The cooling tower 230 may circulate the coolant to the heat-exchange part 220 and an end of the thermal treatment part 100 where thermal treatment and emission takes place. Specifically, the coolant is supplied to an end of the second tube 112 of the thermal treatment part so that the temperature of a substance discharged from the second tube is cooled to 70° C. to 100° C. Accordingly, the gas emitted through the second pipe can be cooled to the temperature range described above and can be easily subjected to dust collection through the first dust collecting unit 122, and the thermally treated substance discharged through the second tube is transferred through a transferring means 115.

The second dust collecting part 250 can perform dust collection of heat-exchanged gas in the heat-exchange part 220 through a bag filter.

As shown in FIG. 1, the gas treatment part 200 may be provided with a water-jetting means that jets water on gas emitted from the second dust collecting part 250 and may include a wet scrubber 260 that emits the water-jetted gas to the air.

The wet scrubber 260 may be provided with a porous filter at a lower part of the water-jetting means. Dust collection may be performed by having the gas that passes through the filter come in contact with water. The water is adjusted to have a pH ranging from 5 to 9, by means of a basic solution in a basic solution tank. Specifically, the basic solution may be a sodium hydroxide solution, and harmful components in the gas may be removed easily within the above-mentioned pH range.

Dust, soot, mercury, cadmium, copper, lead, nickel contents can be collected using the bag filter. Through the wet scrubber 260, sulfuric acid (SOx), ammonia, hydrogen chloride, hydrocarbons, formaldehyde, and the like can be removed. Through the second heating means 212, carbon monoxide and benzene may be removed.

That is, a battery thermal treatment apparatus according to an aspect of the present disclosure can transfer a waste battery through a closed tube 110 while at the same time, thermally treating the waste battery, and can collect thermally treated substances to enable recovery of valuable metals. Harmful gases generated from the thermal treatment can be decomposed and dust collected and then emitted to the air through a first dust collecting part 122, second dust collecting part 250, a second heating means 212, a wet scrubber 260 and the like.

Another aspect of the present disclosure provides a battery thermal treatment and dust collecting method that includes, thermally treating a battery transferred in one direction through a closed tube in a temperature ranging from 400° to 1000° C. in step S10, and cooling and performing dust collection of gas generated from the thermal treatment in step S20.

Hereinafter, a battery thermal treatment and dust collecting method according to an aspect of the present disclosure is described.

In the battery thermal treatment and dust collecting method according to an aspect of the present disclosure, a battery transferred in one direction through a closed tube is thermally treated at a temperature ranging from 400° C. to 1000° C. and emitted in step S10. If the thermal treatment temperature is lower than 400° C., polymer components in the battery may not be easily decomposed. If the thermal treatment temperature is higher than 1000° C., excessive energy may be wasted in removing the polymer and electrolyte and the like of the battery. There is also a possibility that a recovery rate of a valuable metal may be lowered.

The thermal treatment may be performed for 30 minutes to 240 minutes. The polymer component of the battery can be decomposed within the above-mentioned thermal treatment time range while minimizing energy waste.

The thermal treatment may be performed by shooting a flame in a direction opposite to a direction the battery is being transferred or in the same direction as the transferring direction. The thermal treatment may proceed through indirect heating using a heating element such as a heater outside the closed tube. Specifically, when the battery is transferred along the closed pipe, thermal treatment may be performed by shooting a flame in a direction opposite to the transferring direction of the battery through a heating means disposed at one end of the closed pipe.

The closed tube may be a tube having a heating means capable of downwardly inclining and thermally treating the battery at one end, and may be in a form of a rotary kiln.

The closed tube may include a first tube configured to have a heating means disposed at one end and inclined downward at a predetermined angle so that a battery is thermally treated as mentioned above and transferred in one direction. The closed tube may also include a second tube which communicates with the first tube and is configured to incline downward at a predetermined angle so that the thermally treated substance can be cooled and discharged. Thus, at the first tube, a battery is thermally treated while being transferred, and at the second tube, the thermally treated substance can be cooled and discharged. The cooling of the thermally treated substance in the second tube can be performed by spraying water on the outer circumferential surface of the second tube and by having a coolant circulate at a discharge part of the second tube. The cooling temperature may range from 70° C. to 100° C. Further, the inclination angle of the first tube and the second tube may range from 5° to 35°. A battery can be easily transferred while being simultaneously thermally treated within the above-mentioned inclination angle range. At this time, a small amount of gas generated during the thermal treatment process can be transferred through the second tube. Through a dust collection device configured to be communicating with the second tube and provided with a bag filter, the gas can be subject to dust collection.

In a method for battery thermal treatment and performing dust collection of thermal treatment gas according to an aspect of the present disclosure, the cooling and performing dust collection of gas generated during thermal treatment in step S20 may include heat-treating the gas generated during thermal treatment at a temperature ranging from 600° C. to 900° C. first. By heat-treating the gas generated during thermal treatment at the above-mentioned temperature range, a polymer component and the like remaining in the gas can be decomposed. The heat-treatment of the gas can be performed through a heating means that shoots flames in the same direction as the direction in which the gas is transferred.

The cooling treatment of the gas generated during thermal treatment can be performed through a heat-exchanger in which a coolant circulates, and the gas may be cooled to a temperature range of 150° C. to 250° C. By performing the cooling treatment to the above-mentioned temperature range, the efficiency of a subsequent dust collection process can be increased, and damage of a dust collection device can be prevented.

The cooling treatment of the gas generated during thermal treatment may include additionally cooling the cooled gas by spraying the same through a spraying means, to a temperature ranging from 100° C. to 150° C., wherein moisture in the gas is prevented from condensing.

The dust collection process of gas generated during thermal treatment may include passing the cooled gas through a dust collecting device provided with a bag filter.

In addition, the method may include a step of performing further dust collection by spraying water having a pH of 5 to 9 to the dust-collected gas in a direction opposite to the direction the gas is being transferred. The removal of the harmful components in the gas can be facilitated in the above-mentioned pH range. Specifically, by supplying the dust-collected gas to the wet scrubber provided with a water-jetting means and a porous filter at a lower part of the water-jetting means, so that the gas passing through the filter and sprayed water comes in contact, the further dust collection may be performed.

In the dust collection process of gas through a dust collection device provided with the bag filter, dust, soot, mercury, cadmium, copper, lead, and nickel in the gas can be removed.

In the further dust collection process of gas through spraying water, sulfur oxides (SOx), ammonia, hydrogen chloride, hydrocarbons and formaldehyde can be removed.

Through heat-treatment of gas generated in the thermal treatment, carbon monoxide and benzene can be removed.

That is, a method for battery thermal treatment and performing dust collection of thermal treatment gas according to an aspect of the present disclosure enables transferring a waste battery through a closed tube while at the same time, thermally treating the waste battery at a predetermined temperature. The method also enables collecting thermally treated substances to recover valuable metals. By cooling and performing dust collection of harmful gas generated during the thermal treatment, gas free of harmful contents can be emitted to the air.

Hereinafter, the present disclosure is described in more detail using examples and experimental examples. However, the following examples and experimental examples are for illustrative purposes only, and the scope of the present disclosure is not limited thereto.

<Example 1> Thermal Treatment of Waste Battery of an Electric Vehicle Through a Thermal Treatment Apparatus A thermal treatment part 100 is provided, which includes, a first tube 111 wherein a waste battery is transferred at an inclination angle ranging from 5° to 15° relative to the ground surface, provided with a first heating means 113 for heat-treating at a temperature ranging from 600° C. to 800° C. using one or more selected from a group consisting of light oil, refined oil, LNG, LPG, regeneration oil, and so on as fuel to shoot fire in a direction opposite to the direction the waste battery is being transferred; a second tube 112, communicating with the first tube 111 and provided so as to be inclined at an inclination angle ranging from 5° to 15° relative to the ground surface; a coolant jetting means that sprays a coolant at an outer circumferential surface of the second tube; a battery hopper for electric vehicle waste batteries; a conveyor 114 that receives a battery from the battery hopper and puts the battery in the thermal treatment part; a collecting part 121 that collects a substance treated at an end of the second tube; a transferring means 115 for transferring the substance of the collecting part; and a first dust collecting part 122, communicating with an end of the second tube, provided with a bag filter for performing dust collection of gas emitted from the second tube.

Further, a gas handling part 200 is provided, which includes, a third tube 211 that communicates with an upper part of the first tube 111 to transfer gas from the thermal treatment part 100; a second heating means 212, provided at one end of the third tube, using one or more selected from a group consisting of light oil, refined oil, LNG, LPG, regeneration oil, and so on as fuel to shoot flames having a temperature ranging from 600° C. to 800° C. in a direction in which the gas is being transferred; a heat-exchange part 220 communicating with the third tube to cool gas emitted from the third tube; a cooling tower 230 which supplies and circulates a coolant to the heat-exchange part and an end of the second tube 112; a spray tower 240 which communicates with the heat-exchange part and is configured to spray and cool gas emitted from the heat-exchange part through a spraying means; a second dust collecting part 250, communicating with the spray tower, provided with a bag filter which performs dust collection of gas emitted from the spray tower; and a wet scrubber 260, communicating with the second dust collecting part, provided with a water-jetting means that sprays water to gas emitted from the second dust collecting part, and emits the water-jetted gas to the air.

Through the first tube, a waste battery of an electric vehicle was transferred, and was heat-treated by shooting flames using the first heating means, in a direction opposite to the direction in which the batter was being transferred, at a temperature ranging from 600° C. to 800° C. for 30 to 120 minutes. The heat-treated substance was transferred through the second tube, and at this time, water was jetted at an outer circumferential surface of the second tube, and a coolant was made to circulate at an end of the second tube, so as to make the temperature of a thermally treated substance being discharged through the second tube range from 70° C. to 100° C.

Harmful gas generated during the above-mentioned heat-treatment was transferred through the third tube, and through the second heating means, flames were shot in the direction the harmful gas was being transferred, to heat-treat at a temperature of 800° C. The heat-treated harmful gas was passed through a heat-exchanger wherein a coolant is circulated, to cool the heat-treated gas to a temperature of 150° C. The cooled harmful gas was sprayed through a spray means, making the temperature drop to 100° C. The sprayed harmful gas was passed through a dust collection device provided with a bag filter for performing dust collection. The dust-collected gas was passed through a porous filter while being jetted with water for performing further dust collection, and the further dust-collected gas was emitted to the air.

<Example 2> Power Tool Battery Thermal Treatment

Battery thermal treatment and cooling and performing dust collection of gas was carried out in the same manner as in Example 1, except that the battery to be handled was replaced with a power tool battery instead of the electric vehicle battery in Example 1.

<Example 3> Circular Coin Cell Thermal Treatment

Battery thermal treatment and cooling and performing dust collection of gas was carried out in the same manner as in Example 1, except that the battery to be handled was replaced with a circular coin cell instead of the electric vehicle battery in Example 1.

<Example 4> Lithium Polymer Battery Thermal Treatment

Battery thermal treatment and cooling and performing dust collection of gas was carried out in the same manner as in Example 1, except that the battery to be handled was replaced with a lithium polymer battery instead of the electric vehicle battery in Example 1.

<Experimental Example 1> Air Pollutant Emission Concentration Measurement

Using the battery thermal treatment apparatus provided in Example 1, the concentration of contaminants in the gas emitted finally after the thermal treatment of the power tool battery, the circular cell, the lithium polymer battery, and the electric vehicle battery, and the results are shown in Table 1.

Sulfuric Acid (SOx), Ammonia, Hydrogen Chloride, Hydrocarbons, Formaldehyde

TABLE 1

| Measured item | Power tool battery | Circular cell | Lithium polymer cell | Electric vehicle cell |
|---|---|---|---|---|
| Dust (mg/Sm$^3$) | 11.9 | | | |
| Sulfuric acid (SO$_x$) (ppm) | 357 | | | |
| Nitrogen Oxide (NO$_x$) (ppm) | 51 | | | |
| CO (ppm) | 895 | | | |
| Soot (degree) | 4 | | | |
| Ammonia (ppm) | 56 | 37.27 | 155.92 | 42.19 |
| Hydrogen chloride (ppm) | 2.83 | 24.3 | | |
| Hydrocarbon (ppm) | 40.2 | | | |
| Formaldehyde (ppm) | 33.113 | 1.268 | 0.073 | |
| Benzene (ppm) | 0.12 | | | |
| Mercury (mg/Sm$^3$) | 0.101 | | | |
| Cadmium (mg/Sm$^3$) | 1.524 | 0.153 | 0.091 | |
| Copper (mg/Sm$^3$) | 0.87 | 0.08 | 1.21 | |
| Lead (mg/Sm$^3$) | 0.19 | | | |
| Nickel (mg/Sm$^3$) | 1.838 | 0.22 | 3.632 | 0.113 |

As shown in Table 1, it was confirmed that, in the case of gas collected after the thermal treatment of the electric vehicle cell, most harmful components satisfy the emission allowance criteria. In all types of battery thermal treatment, carbon disulfide, hydrogen sulfide, fluoride, hydrogen cyanide, bromine, styrene, phenol, vinyl chloride, arsenic, chromium, zinc, phosphorus, manganese, dichloromethane and trichlorethylene were not detected.

Although the exemplary embodiments of a battery thermal treatment apparatus and method according to an aspect of the present disclosure have been described above, it is apparent that various modifications can be made without departing from the scope of the present disclosure.

Therefore, the scope of the present invention should not be limited to the embodiments described, but should be determined by the scope of the appended claims and equivalents thereof.

That is, it is to be understood that the foregoing embodiments are illustrative and not restrictive in all respects and that the scope of the present disclosure is indicated by the appended claims rather than the foregoing description, and all changes or modifications derived from the equivalents thereof should be construed as being included within the scope of the present invention.

| REFERENCE NUMERALS |
|---|
| 100: thermal treatment part |
| 110: closed tube |
| 111: first tube |
| 112: second tube |
| 113: heating means |
| 114: conveyor |
| 115: transferring means |
| 121: collecting part |
| 122: first dust collecting part |
| 200: gas handling part |
| 210: gas heat-treatment part |
| 211: third tube |
| 212: second heating means |
| 220: heat-exchange part |
| 230: cooling tower |
| 240: spray tower |
| 250: second dust collecting part |
| 260: wet scrubber |
| 1000: battery thermal treatment apparatus |

What is claimed is:

1. A battery thermal treatment apparatus comprising,
 a thermal treatment part, in which a battery is transferred and thermally treated through a closed tube; and
 a gas handling part, which cools and performs dust collection of gas generated in the thermal treatment part,
 wherein the gas handling part comprises:
  a gas heat-treatment part configured to communicate with an upper part of the thermal treatment part, to heat-treat gas from the thermal treatment part by injecting additional heat;
  a heat-exchange part communicating with the gas heat-treatment part to cool transferred gas therefrom;
  a cooling tower which circulates a coolant to the heat-exchange part, wherein the cooling tower supplies and circulates the coolant to an end of the closed tube; and
  a second dust collecting part which collects dust from gas emitted from the heat-exchange part.

2. The apparatus of claim 1, wherein the thermal treatment part includes,
 a first tube, wherein a battery is transferred in a downwardly inclined manner, provided with a first heating means at one end; and
 a second tube, communicating with the first tube and provided so as to be inclined downwards.

3. The apparatus of claim 2, wherein the first tube and the second tube has a form of a rotary kiln inclined at an angle ranging from 5° to 30° in respect to a ground surface.

4. The apparatus of claim 2, wherein,
 the first heating means, shoots flames at a same or opposite direction of a direction the battery is being transferred, or is provided at an outer circumferential surface of the closed tube to heat the closed tube.

5. The apparatus of claim 1, further comprising,
a battery hopper; and a conveyor for receiving a battery from the battery hopper and putting the battery into the thermal treatment part.

6. The apparatus of claim 1, wherein the gas handling part comprises,
a third tube that communicates with an upper part of the thermal treatment part to transfer gas therefrom; a second heating means, provided at one end of the third tube, to shoot flames in a direction in which the gas is being transferred.

7. The apparatus of claim 1, wherein the gas handling part comprises,
a spray tower which communicates with the heat-exchange part and the second dust collecting part, and is configured to spray gas emitted from the heat-exchange part through a spraying means and then emit to the second dust collecting part.

8. The apparatus of claim 1, wherein the gas handling part comprises,
a wet scrubber, communicating with the second dust collecting part, provided with a water-jetting means that sprays water to gas emitted from the second dust collecting part, and emits water-jetted gas to air.

9. A method for battery thermal treatment and performing dust collection of thermal treatment gas, comprising,
cooling and performing dust collection of gas generated during thermal treatment of a battery, which is transferred and in one direction through a closed tube, thermally treated at a temperature ranging from 400° C. to 1000° C., and discharged, and
wherein the cooling and performing dust collection of gas generated during thermal treatment includes heat-treating the gas generated during thermal treatment at a temperature ranging from 600° C. to 900° C., and
wherein the cooling of the gas generated during thermal treatment is performed through a heat-exchanger in which a coolant circulates, and the gas is cooled to a temperature range of 150° C. to 250° C., and a cooling tower supplies and circulates the coolant to the heat-exchanger and an end of the closed tube.

10. The method of claim 9, wherein,
the thermal treatment is performed for 30 to 240 minutes.

11. The method of claim 9, wherein the cooling comprises,
cooling the gas that has been heat-treated to a temperature ranging from 100° C. to 150° C., by spraying the gas that has been heat-treated.

12. The method of claim 9, wherein the dust collection of the gas comprises,
passing the gas through a dust collecting part provided with a bag filter.

13. The method of claim 12, wherein the dust collection process comprises,
spraying water having a pH of 5 to 9 to the gas that was passed through the dust collecting part.

14. The method of claim 9, wherein the discharging of the battery comprises,
cooling the thermally treated battery to a temperature ranging from 70° C. to 100° C. to discharge the thermally treated battery.

* * * * *